United States Patent
Urata et al.

(10) Patent No.: US 6,586,525 B1
(45) Date of Patent: Jul. 1, 2003

(54) BINDER RESIN FOR POLYOLEFIN RESIN, PROCESS FOR PRODUCING THE SAME, AND USES THEREOF

(75) Inventors: Keiji Urata, Iwakuni (JP); Takaaki Ueda, Iwakuni (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 0 days.

(21) Appl. No.: 09/787,407

(22) PCT Filed: Oct. 7, 1999

(86) PCT No.: PCT/JP99/05514
§ 371 (c)(1),
(2), (4) Date: Mar. 21, 2001

(87) PCT Pub. No.: WO00/26310
PCT Pub. Date: May 11, 2000

(30) Foreign Application Priority Data

Oct. 30, 1998 (JP) ............................................. 10-309609
Sep. 9, 1999 (JP) ............................................. 11-255622

(51) Int. Cl.⁷ ............................................. C09D 151/06
(52) U.S. Cl. ............................. 525/63; 525/64; 525/65; 525/66; 525/69; 525/70; 525/72; 525/80; 525/242; 525/285; 525/326.4
(58) Field of Search ............................. 525/326.4, 242, 525/285, 63, 64, 65, 66, 69, 70, 72, 80

(56) References Cited

U.S. PATENT DOCUMENTS

| | | | |
|---|---|---|---|
| 5,811,489 A | 9/1998 | Shirai et al. | |
| 6,133,346 A | 10/2000 | Ueda et al. | |

FOREIGN PATENT DOCUMENTS

| | | |
|---|---|---|
| JP | 58-80357 | 5/1983 |
| JP | 4-88026 | 3/1992 |
| JP | 4-89832 | 3/1992 |
| JP | 6-172565 | 6/1994 |
| JP | 9-176522 | 7/1997 |
| JP | 9-176562 | 7/1997 |
| JP | 10-168123 | 6/1998 |

OTHER PUBLICATIONS

Patent Abstracts of Japan, JP 10–36601, Feb. 10, 1998.

*Primary Examiner*—Jeffrey Mullis
(74) *Attorney, Agent, or Firm*—Oblon, Spivak, McClelland, Maier & Neustadt, P.C.

(57) ABSTRACT

The invention provides a binder resin and a primer composition, paint composition, ink composition an adhesive composition with excellent gasohol resistance, adherence, weather resistance, etc. to polyolefinic resins and relates to a binder resin for polyolefinic resins comprising carboxyl group-containing chlorinated polyolefin (II), which contains not more than 2% of a component with molecular weight of 2,000 or lower and which has a ratio of weight average molecular weight (Mw) to number average molecular weight (Mn), that is the value Mw/Mn of not more than 4.

19 Claims, No Drawings

BINDER RESIN FOR POLYOLEFIN RESIN, PROCESS FOR PRODUCING THE SAME, AND USES THEREOF

BACKGROUND OF THE INVENTION

The present invention relates to a binder resin applicable to polyolefinic resins, for example, polypropylene, polyethylene, ethylene-propylene copolymer, ethylene-propylene-diene copolymer, etc. In more detail, it relates to a primer, paint, ink and adhesive composition to be used for the purpose of protection or beautiful ornament of polyolefinic resin moldings, films, etc.

Because of high productivity and broad degree of freedom for design as well as many advantages of light weight, antirust, shock resistance, etc., in recent years, plastics are used very frequently as the materials for automotive parts, electrical parts, building materials, food packaging film, etc. Above all, because of low price and many excellent properties such as moldability, chemical resistance, heat resistance, water resistance and good electrical characteristics, polyolefinic resins are used in broad range as industrial materials and are one of the materials that the growth of demand is most expected in future.

Different from synthetic resins with polarity such as polyurethane resin, polyamide resin, acrylic resin, polyester resin, etc., however, polyolefinic resin is nonpolar and crystalline, leading to drawbacks of difficult paintability and adhesion.

For the painting and adhesion onto such hard-adherent polyolefinic resin, low-chlorinated polyolefin that has strong adherence onto polyolefinic resin has been used so far as a binder resin.

For example, in Japanese Unexamined Patent Publication Nos. Sho 57-36128 and Sho 59-166534Japanese Patent Publication No. Sho 63-36624, etc., low-chlorinated polypropylene or low-chlorinated propylene-$\alpha$-olefin copolymer with chlorine content of 5 to 50%, containing carboxylic acid and/or carboxylic anhydride, is proposed as a painting primer or coating binder resin onto polyolefinic moldings.

Moreover, a composition (Japanese Unexamined Patent Publication Nos. Hei 4-248845 and 5-25405) having modified copolymer obtainable by graft copolymerizing $\alpha$, $\beta$-unsaturated vinyl monomer containing hydroxyl group onto styrene.conjugated diene block copolymer, followed by further chlorination, as an essential component, a composition (Japanese Unexamined Patent Publication No. Hei 5-25405) having chlorinated product of graft modified product from styrene.isoprene block copolymer as an essential component, a composition (Japanese Unexamined Patent Publication Nos. Hei 5-112750 and Hei 5-112751) having chlorinated product of graft modified product from propylene-ethylene-$\alpha$-olefin random copolymer as an essential component, etc. are also proposed.

Although these compositions exhibit good adherence onto hard-adherent polyolefin, they are remarkably poor in the "gasohol resistance test" being a criterion of solvent resistance, that is, in a testing method wherein painted plate is soaked into a gasoline/alcohol mixed solution (gasohol) obtainable by adding 10% of lower alcohol such as methanol or ethanol to regular gasoline and whether the solvent resistance is good or bad is judged by a time until the painted film is peeled off.

Also, a method of crosslinking carboxyl group-containing chlorinated polyolefin with epoxy resin that can be seen in Japanese Patent Publication Nos. Sho 63-50381 and Hei 01-16414 and Japanese Unexamined Patent Publication No. Hei 8-100032, etc., is excellent in the socalled gasoline resistance to soak only in regular gasoline, but poor in the gasohol resistance property.

Further, such descriptions can be seen that a composition (Japanese Unexamined Patent Publication Nos. Hei 7-247381 and Hei 7-247382) having modified chlorinated polyolefin obtained by reacting carboxyl group-containing chlorinated polyolefin with low-molecular diol or low-molecular compound containing hydroxyl group and amino group as an essential component and a composition (Japanese Unexamined Patent Publication No. Hei 10-158447) obtained by mixing carboxyl group-containing chlorinated polyolefin with acrylic-modified chlorinated polyolefin that was modified with acrylic resin with glass transition point of higher than 60° C., etc. are excellent in the gasohol resistance, but it is difficult to say that both really satisfy the gasohol resistance.

The invention provides a primer composition with improved gasohol resistance and adherence usable for painting the moldings, sheets, etc. of polyolefinic resins.

SUMMARY OF THE INVENTION

The primer composition of the invention that solves the subject aforementioned is a binder resin for polyolefinic resins comprising carboxyl group-containing chlorinated polyolefin obtainable by graft copolymerizing at least one kind of unsaturated carboxylic monomer selected from carboxylic acid and/or carboxylic anhydride onto polyolefin (I) in amounts of 1 to 10 wt. % and then chlorinating to chlorine content of 10 to 30 wt. %, and having carboxyl group-containing chlorinated polyolefin (II), which contains only not more than 2% of a component with molecular weight of 2,000 or lower, being the low-molecular weight region of said carboxyl group-containing chlorinated polyolefin, and which has a value of Mw/Mn, being a ratio of weight average molecular weight (Mw) to number average molecular weight (Mn), of not more than 4, as a major binder resin.

DETAILED DESCRIPTION OF THE INVENTION

The polyolefin graft copolymerized with unsaturated carboxylic acid concerning the invention can be obtained by melting polyolefin under heat and, if need be, reducing viscosity or degrading it by thermal decomposition, and then by graft copolymerizing unsaturated carboxylic acid monomer of carboxylic acid and/or carboxylic anhydride in amounts of 1 to 10 wt. % batchwise or continuously in the presence of radical generator.

As the polyolefins (I), crystalline polypropylene, noncrystalline polypropylene, propylene-$\alpha$-olefin copolymer etc. can be used solely or by mixing two or more kinds, but, from the points of workability and adhesiveness of binder resin, a crystalline polypropylene with weight average molecular weight of 10,000 to 150,000, a propylene-$\alpha$-olefin copolymer with weight average molecular weight of 10,000 to 150,000 in which 70 to 97 mol % of propylene component is contained and number of carbon atoms is 2 or 4 to 6, a propylene-butene-ethylene terpolymer with weight average molecular weight of 10,000 to 150,000 in which 70 to 97 mol % of propylene component, 2 to 25 mol % of butene component and 2 to 25 mol % of ethylene component are contained, or the like can be used. In the case of propylene-$\alpha$-olefin copolymer, the $\alpha$-olefin unit is preferable to be at least one kind of α-olefin with number of carbon atoms of 2 or 4 to 6 selected from, for example, ethylene, 1-butene, 1-pentene, 4-methyl-1-pentene, 3-methyl-1-pentene and 1-hexene.

If the weight average molecular weight of raw material polyolefin (I) is under 10,000 or the propylene component is under 70 mol %, then the adherence to polyolefinic resin and the gasohol resistance become poor, and, if the weight average molecular weight exceeds 150,000, then the primer does not become fine particles when painting by air spray etc. to spoil the beautiful appearance of painted surface, which is unpreferable. Moreover, if the number of carbon atoms of α-olefin of propylene-α-olefin copolymer exceeds 6, then the adherence to polypropylene resin becomes poor. Furthermore, the propylene content of propylene-butene-ethylene copolymer being terpolymer is preferable to be 70 to 97 mol % as described above, the butene content is preferable to be 2 to 25 mol % and the ethylene content is preferable to be 2 to 25 mol %.

The unsaturated carboxylic acid monomers usable for introducing carboxyl group include acrylic acid, methacrylic acid, maleic acid, maleic anhydride, fumaric acid, intaconic acid, itaconic anhydride, aconitic acid, aconitic anhydride, etc. and the amount of graft copolymerization is preferable to be 1 to 10 wt. % to polyolefin. If under 1%, the gasohol resistance becomes poor and the adherence to upper paint also becomes poor. If over 10%, the adherence to polyolefinic resin becomes poor and simultaneously increased solution viscosity due to hydrogen bond is seen, resulting in gelation on preservation and poor workability by air spray etc.

The radical generators to be used for the graft copolymerization reaction between polyolefin (I) and unsaturated carboxylic acid monomer include, for example, peroxides such as di-tert-butyl peroxide, tert-butyl hydroperoxide, dicumyl peroxide, benzoyl peroxide, tert-butyl peroxide benzoate, methyl ethyl ketone peroxide and di-tert-butyl diperphthalate and azonitriles such as azobisisobutyronitrile.

The chlorine content of carboxyl group-containing chlorinated polyolefin (II) to be used in the invention is preferable to be 10 to 30 wt. %. If the chlorine content is under 10 wt. %, then the solubility into organic solvents such as toluene and xylene is poor and uniform solution cannot be obtained, resulting in gelation at low temperature or generation of grains, hence the solution becomes not to be applied as a primer. If the chlorine content exceeds 30 wt. %, the adherence to polyolefinic resin and the gasohol resistance become poor, which is unpreferable.

The less the component of low-molecular weight region of carboxyl group-containing chlorinated polyolefin (II) to be used in the invention, the better the gasohol resistance. That is, if the component with molecular weight of 2,000 or lower is contained over 2%, the gasohol resistance becomes poor remarkably. Moreover, the ratio of weight average molecular weight (Mw) to number average molecular weight (Mn) of (II), that is, the value of Mw/Mn is preferable to be not more than 4. When it exceeds 4 due to increase in the component of high-molecular weight region, the primer does not become fine particles when painting by air spray etc. and the beautiful appearance of coated surface is spoiled, which is unpreferable. When it exceeds 4 due to increase in the component of low-molecular weight region, the gasohol resistance becomes poor.

Besides, the content of low-molecular weight component with molecular weight of 2,000 or lower and the ratio of weight average molecular weight (Mw) to number average molecular weight (Mn), that is, Mw/Mn were determined by means of gel permeation chromatograph (GPC), using polystyrene with known molecular weight and narrow molecular weight distribution as a standard substance.

The carboxyl group-containing chlorinated polyolefin (II) to be used in the invention can be obtained by warming to completely dissolve polyolefin that was graft copolymerized with unsaturated carboxylic acid into solvents for chlorinating reaction, for example, chloroform, carbon tetrachloride, tetrachloroethylene, tetrachloroethane, etc., and then blowing-in chlorine gas to react at applied pressure or ambient pressure in the presence of radical generator as described above or under irradiation of ultraviolet rays, or in the absence of these radical generator and ultraviolet rays. The chlorinating reaction is conducted unusually at a temperature between 60° C. and 120° C.

As the method for removing low-molecular weight component of carboxyl group-containing chlorinated polyolefin, two methods of (1) a method for extracting to remove low-molecular weight component in carboxyl group-containing polyolefin before chlorination with solvent and (2) a method for extracting to remove low-molecular weight component in carboxyl group-containing chlorinated polyolefin after chlorination with solvent can be proposed.

For removing low-molecular weight component by the method (1), it is possible to remove by making carboxyl group-containing polyolefin before chlorination powdery, granular, pellet-like or molten state and by adding sole solvent selected from a group consisting of aliphatic hydrocarbon, aromatic hydrocarbon, alicyclic hydrocarbon, halogenated hydrocarbon, alcohols, esters, ketones and ethers with boiling point of lower than 120° C. or a mixed solvent thereof to dissolve out the low-molecular weight component into these solvents within a temperature range of 10 to 100° C.

The reason why the boiling point of solvent was made to be lower than 120° C. is because of that, if the boiling point is too high, solvent becomes to be liable to remain in the carboxyl group-containing polyolefin or carboxyl group-containing chlorinated polyolefin (II), resulting in chlorination of said solvent or decreased physical properties of primer, which is unpreferable.

The reason why the temperature on extraction was made 10 to 100° C. is because of that, if under 10° C., removal of low-molecular weight component by extraction becomes incomplete, which is unpreferable. Also, if over 100° C., even high-molecular weight component is removed to decrease the recovery rate, which is unpreferable. When using a solvent with boiling point of under 100° C., it is preferable to conduct the solvent extraction in a completely closed-up pressure vessel.

The method for removing low-molecular weight component by the method (2) is also possible to conduct with carboxyl group-containing chlorinated polyolefin, following the method (1). When the carboxyl group-containing chlorinated polyolefin is in solution, the temperature on extraction is preferable to be as low as possible, but, if under 0° C., the solvent extraction of low-molecular weight component cannot be conducted efficiently, because of too high viscosity. If the temperature becomes higher than room temperature, then the carboxyl group-containing chlorinated polyolefin dissolves into extracting solvent in large quantity to decrease the recovery rate, which is unpreferable. When the carboxyl group-containing chlorinated polyolefin is solid article, the higher the extraction temperature, the better, but, if over 100° C., dehydrochloric acid etc. are caused to bring to instability, which is unpreferable.

As typical solvents with boiling point of under 120° C. for removing low-molecular weight component, in the case of aliphatic hydrocarbon, pentane, 2-methylpentane, hexane, 2,2-dimethylbutane, 2,3-dimethyl-butane, heptane, 2-methylhexane, 3-methylhexane, 2,4-dimethylpentane, petroleum ether, petroleum benzine, etc. can be exemplified. In the case of aromatic hydrocarbon, benzene, toluene, etc. can be exemplified. In the case of alicyclic hydrocarbon, cyclopentane, methylcyclopentane, cyclohexane, methylcyclohexane, ethylcyclohexane, etc. can be exemplified. In the case of halogenated hydrocarbon, trichloromethane, tetrachloromethane, 1,1-dichloroethane, 1,2-dichloroethane, 1,1,1-trichloroethane, 1,1,2-trichloroethane, 1,1-dichloroethylene, 1,2-dichloroethylene, trichloroethylene, etc. can be exemplified. In the case of alcohols, methanol, ethanol, 2-propanol, 1-butanol, 2-butanol, isobutyl alcohol, tert-butyl alcohol, 2-pentanol, 3-pentanol, etc. can be exemplified. In the case of esters, propyl formate, butyl formate, methyl acetate, ethyl acetate, propyl acetate, isopropyl acetate, isobutyl acetate, secbutyl acetate, etc. can be exemplified. In the case of ketones, acetone, methyl ethyl ketone, 2-pentanone, 3-pentanone, methyl isobutyl ketone, etc. can be exemplified. In the case of ethers, diethyl ether, dipropyl ether, diisopropyl ether, etc. can be exemplified.

The carboxyl group-containing chlorinated polyolefin (II) to be used in the invention can be used as it is by coating or spray painting in the state of clear varnish. But, it can also be used as a primer, paint and ink for polyolefinic resin moldings and films by adding titanium dioxide, carbon black, aluminum paste, coloring pigment, etc. and, if need be, other additives, for example, ultraviolet absorber, antioxidant, pigment sedimentation preventer, etc. followed by kneading. Moreover, it can also be used as an adhesive for those substrates.

Moreover, the carboxyl group-containing chlorinated polyolefin (II) exhibits balanced physical properties of painted film by itself, but, by adding alkyd resin, acrylic resin, polyacrylic polyol, polyester resin, polyesterpolyol, polyether resin, polyetherpolyol or polyurethane resin for use, more characteristic binder resin composition can be obtained.

The addition of said resins is very useful, since the adherence onto upper coating paint and the weather resistance that was a drawback of chlorinated polyolefinic resin improve. From such reason, by allowing to have a resin mixed at a ratio by weight of carboxyl group-containing chlorinated polyolefin (II)/said resin group=3/7 to 9/1 as a major binder resin, more improved binder resin composition can be obtained.

Namely, contrary to the facts that, when said resin group is mixed with conventional carboxyl group-containing chlorinated polyolefin, not only the adherence onto polyolefin decreases, but also the gasohol resistance decreases remarkably, in the case of the carboxyl group-containing chlorinated polyolefin (II) of the invention, mixing of said resin group even up to 70% at maximum does not injure the adherence and the gasohol resistance. Furthermore, when titanium dioxide, carbon black, coloring pigment, etc. are kneaded beforehand with said resin and then (II) is mixed, there is an advantage that stabilized pigment dispersion can be achieved. That is, minimum requirement level of said resin to achieve stabilized pigment dispersion is 10%.

For the chlorinated resin like the carboxyl group-containing chlorinated polyolefin.(II) obtainable by the method aforementioned, epoxy compound has been added so far as a stabilizer for use. Although the epoxy compound is not particularly restricted, one compatible with chlorinated resin is preferable, and such epoxy compound with epoxy equivalent of around 100 to 500 and with one or more epoxy group per molecule can be exemplified.

For example, epoxidated soybean oil and epoxidated linseed oil obtainable by epoxidating vegetable oils having natural unsaturated group with peracids such as peracetic acid, epoxidated fatty acid esters obtainable by epoxidating unsaturated fatty acids such as oleic acid, tall oil fatty acid and soybean oil fatty acid, epoxidated alicyclic compounds represented by epoxidated tetrahydrophthalate, and products obtainable by condensing bisphenol A or polyhydric alcohol with epichlorohydrin, for example, bisphenol A glycidyl ether, ethylene glycol glycidyl ether, propylene glycol glycidyl ether, glycerol polyglycidyl ether, sorbitol polyglycidyl ether, etc. are exemplified. Moreover, monoepoxy compounds represented by butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, phenol polyethylene oxide glycidyl ether, etc. are exemplified. Moreover, metallic soaps such as calcium stearate and lead stearate, organometallic compounds such as dibutyl tin dilaurate and dibutyl tin maleate and hydrotalcite compounds, which are used as the stabilizers of poly (vinyl chloride) resin, can also be used, and it doesn't matter whether these are used in combination.

The carboxyl group-containing chlorinated polyolefin (II) obtainable by the method aforementioned can be used by replacing the solvent to aromatic hydrocarbon such as toluene or xylene, or alicyclic hydrocarbon such as cyclohexane or methylcyclohexane, being good solvents, after completion of chlorinating reaction and after distillation of chlorination solvent, and then by adding stabilizer such as epoxy compound. In the case of the carboxyl group-containing chlorinated polyolefin (II) of the invention, however, due to the hydrogen bond originating from carboxyl group contained, the solution viscosity increases over time. For preventing this, it is possible to partially add a solvent with polarity, for example, ester type solvent such as ethyl acetate, ketone type solvent such as methyl ethyl ketone, ether type solvent such as tetrahydrofuran, or alcohol type solvent such as isopropanol for use. Above all, the effect of alcohol type solvent is conspicuous and it is only necessary to add 1 to 10 wt. % to the solvent composition.

Moreover, it may also be safe that, after completion of chlorinating reaction and after removal of hydrochloric acid in the solvent for chlorinating reaction such as chloroform, epoxy compound or the like is added as a stabilizer and the stabilized material is solidified by supplying to a vent extruder equipped with solvent-removing suction at the part of screw shaft, and, thereafter, it is dissolved into solvent such as toluene. The solidification can be implemented by the publicly known method, for example, by using a vent extruder equipped with underwater cutting pelletizer at the outlet part of extruder, a pelletizer capable of cutting strand-like resin, and the like.

The feature of the invention lies in the carboxyl group-containing chlorinated polyolefin (II) with low-molecular weight component of carboxyl group-containing chlorinated polyolefin removed and with moderate ratio of weight average molecular weight (Mw) to number average molecular weight (Mn), that is, Mw/Mn value, thus providing a primer composition that exhibits excellent adherence and gasohol resistance to polyolefinic resins. Although it is not clear why the removal of low-molecular weight component improves the gasohol resistance, it is considered that these low-molecular weight components are addition products of chlorine and carboxylic acid to olefin oligomers produced through the decomposition of polyolefin by heat and catalyst. If considering that the swelling or dissolution of this component into gasoline and alcohol being components of gasohol lowers the gasohol resistance, it can be said that the removal of low-molecular weight component is one of the reasons that improves the gasohol resistance.

In following, the invention will be illustrated concretely based on examples, but the invention is not confined to these.

EXAMPLE

Preparing Example 1

In a three-neck flask attached with stirrer, dropping funnel and cooling pipe for refluxing monomer, 5 kg of crystalline polypropylene with weight average molecular weight of 40,000 were placed and molten completely in an oil bath kept constantly at 180° C. The inside of flask was replaced with nitrogen, 300 g of maleic anhydride were put in over about 5 minutes while stirring, and then 20 g of di-tert-butyl peroxide dissolved into 50 ml of heptane were put in over about 30 minutes from dropping funnel. At this time, the inside of system was kept at 180° C. After continued the reaction further for 15 minutes, unreacted maleic anhydride was removed over about 30 minutes while reducing the pressure in flask by aspirator to obtain maleic anhydride-modified polypropylene copolymerized with maleic anhydride.

Next, after cooling to ambient temperature, this product was pulverized and 5 kg thereof were thrown into a pressure vessel attached with stirrer. Then, 5 kg of n-hexane (bp. 68.7° C.) and 5 kg of methyl ethyl ketone (bp. 79.6° C.) were put in to dissolve out low-molecular weight component into solvent while stirring for 4 hours at 100° C. Following this, solvent was taken off by filtration, the filter residue was washed with said solvent and then it was dried for 24 hours at 70° C. in a blast dryer to obtain 4.65 kg of maleic anhydride-modified polypropylene with low-molecular weight component removed.

Next, 4 kg of maleic anhydride-modified polypropylene with low-molecular weight component removed were thrown into a glass-lined reactor, 80 liters of chloroform were added, and, after sufficiently dissolved at 120° C. under pressure of 4 kg/cm$^2$, chlorine gas was blown-in from the bottom of reactor. while keeping the temperature at 110° C. to conduct the chlorination reaction until the chlorine content became 25 wt. %. The solvent chloroform was distilled off by evaporator to replace it with a mixed solvent of toluene/cyclohexane=65/35 (wt.), and Epicote 828 (condensation product of bisphenol A with epichloro-hydrin, an epoxy resin with epoxy equivalent of 184 to 194, from Shell Chemicals Corp.) was added in amounts of 4% based on solids as a stabilizer, followed by concentration adjustment, thus obtaining carboxyl group-containing chlorinated polypropylene (A-1) in the form of solution with solids concentration of 20%.

When measuring the molecular weight of (A-1), Mw/Mn=2.90 was observed and the content of low-molecular weight component with molecular weight of less than 2,000 was 0.25%.

Preparing Example 2

In a three-neck flask attached with stirrer, dropping funnel and cooling pipe for refluxing monomer, 5 kg of propylene-butene-ethylene copolymer (terpolymer) with weight average molecular weight of 120,000 consisting of 75 mol % of propylene component, 17 mol % of butene component and 8 mol % of ethylene component were placed and molten completely in an oil bath kept constantly at 180° C. The inside of flask was replaced with nitrogen, 350 g of maleic anhydride were thrown-in over about 5 minutes while stirring, and then 35 g of dicumyl peroxide dissolved into 50 ml of heptane were put in over about 30 minutes from dropping funnel. At this time, the inside of system was kept at 180° C. After continued the reaction further for 15 minutes, unreacted maleic anhydride was removed over about 30 minutes while reducing the pressure in flask by aspirator to obtain maleic anhydride-modified propylene-butene-ethylene copolymer copolymerized with maleic anhydride.

Next, this product was made pellet-like and 5 kg thereof were put into a three-neck flask attached with stirrer and cooling pipe for refluxing solvent. Then, 10 kg of ethyl acetate (bp. 77.1° C.) were thrown-in to dissolve out low-molecular weight component into solvent while refluxing solvent for 4 hours at 77° C. Following this, solvent was taken off by filtration, the filter residue was washed with said solvent and then it was dried for 24 hours at 70° C. in a blast dryer to obtain 4.75 kg of maleic anhydride-modified propylene-butene-ethylene copolymer with low-molecular weight component removed.

Next, 4 kg of product with low-molecular weight component removed were put into a glass-lined reactor, 80 liters of chloroform were added, and, after sufficiently dissolved at 100° C. by stirring under pressure of 3 kg/cm$^2$, chlorine gas was blown-in from the bottom of reactor while irradiating ultraviolet rays and keeping the reaction temperature at 80° C. to conduct the chlorination reaction until the chlorine content became 12 wt. %. The solvent chloroform was distilled off by evaporator to replace it with toluene, and Epicote 828 was added in amounts of 4% based on solids as a stabilizer, followed by concentration adjustment, thus obtaining carboxyl group-containing chlorinated propylene-butene-ethylene copolymer (A-2) in the form of toluene solution with solids concentration of 20%.

When measuring the molecular weight of (A-2), Mw/Mn=3.85 was observed and the content of low-molecular weight component with molecular weight of less than 2,000 was 1.20%.

Preparing Example 3

Except that propylene-ethylene copolymer with weight average molecular weight of 50,000 consisting of 94 mol % of propylene component and 6 mol % of ethylene component was sampled, maleic anhydride was copolymerized by the method quite similar to preparing example 2 to obtain maleic anhydride-modified propylene-ethylene copolymer.

Next, after cooling to ambient temperature, this product was pulverized and 5 kg thereof were put into a three-neck flask attached with stirrer and cooling pipe for refluxing solvent. Then, 10 kg of methyl ethyl ketone (bp. 79.6° C.) were put in to dissolve out low-molecular weight component into solvent while refluxing for 4 hours at 79° C. Following this, solvent was taken off by filtration, the filter residue was washed with said solvent and then it was dried for 24 hours at 70° C. in a blast dryer to obtain 4.7 kg of maleic anhydride-modified propylene-ethylene copolymer with low-molecular weight component removed.

Next, 4 kg of this product were thrown into a glass-lined reactor with stirrer, 80 liters of chloroform were added, and, after sufficiently dissolved at. 110° C. under pressure of 3 kg/cm², 5 g of azobisisobutyronitrile were added as a reaction catalyst and chlorine gas was blown-in from the bottom of reactor to conduct the chlorination reaction until the chlorine content became 17 wt. %. After the solvent chloroform was distilled off partially by evaporator, tert-butylphenyl glycidyl ether (monoepoxy) was added in amounts of 5% based on solids as a stabilizer, and residual chloroform was removed completely with a vent extruder installed with vent port for distilling it under reduced pressure to obtain carboxyl group-containing chlorinated propylene-ethylene copolymer in the form of solid product. Then, this solid product was dissolved into toluene to obtain (A-3) that was adjusted to toluene solution with solids concentration of 20%.

When measuring the molecular weight of (A-3), Mw/Mn=3.65 was observed and the content of low-molecular weight component with molecular weight of less than 2,000 was 0.75%.

Preparing Example 4

Five kg of maleic anhydride-modified polypropylene, in which the low-molecular weight component was not removed in Preparing example 1 were put into a glass-lined reactor and 80 liters of chloroform were added. After sufficiently dissolved at 120° C. under pressure of 4 kg/cm², chlorine gas was blown-in from the bottom of reactor while keeping the temperature at 110° C. and irradiating ultraviolet rays to conduct chlorination reaction until the chlorine content became 25 wt. %, and the solvent chloroform (bp. 61.2° C.) was concentrated by evaporator until the solids content became 25%. Then, 1 kg of this concentrated liquid was added dropwise into 10 liters of acetone (bp. 56.1° C.) at room temperature to cause bread-crumbs-like precipitates and these precipitates were recovered (recovery rate: 70%) by centrifugal separation. Besides, the low-molecular weight component is removed by dissolving out into supernatant.

Next, these precipitates were dried under reduced pressure and, after Epicote 828 was added in amounts of 4% based on solids as a stabilizer, they were dissolved into a mixed solvent of toluene/cyclohexane=65/35 to obtain carboxyl group-containing chlorinated polypropylene (A-4) with low-molecular weight component removed in the form of solution with solids concentration of 20%.

When measuring the molecular weight of (A-4), Mw/Mn=2.55 was observed and the content of low-molecular weight component with molecular weight of less than 2,000 was 0.12%.

Preparing Example 5

Five kg of maleic anhydride-modified propylene-butene-ethylene copolymer in which the low-molecular weight component was not removed in Preparing example 2 were thrown into a glass-lined reactor with stirrer and 80 liters of chloroform were added. After sufficiently dissolved at 100° C. by stirring under pressure of 3 kg/cm², 5 g of azobisisobutyronitrile were added as a radical generator and, while keeping this temperature, chlorine gas was blown-in from the bottom of reactor to conduct chlorination reaction until the chlorine content became 12 wt. %. The solvent chloroform was distilled off by evaporator and replaced with toluene (b.p. 110.6° C.) to adjust to toluene solution with solids concentration of 20%. Then, 1 kg of this solution was added dropwise into 10 liters of methanol (bp. 64.5° C.) at temperature of 10° C. to cause bread-crumbs-like precipitates and these precipitates were recovered (recovery rate: 60%) by centrifugal separation. Besides, the low-molecular weight component is removed by dissolving out into supernatant.

Next, these precipitates were dried under reduced pressure and, after Epicote 828 was added in amounts of 4% based on solids as a stabilizer, they were dissolved into toluene to obtain carboxyl group-containing chlorinated propylene-butene-ethylene copolymer (A-5) in the form to toluene solution with solids concentration of 20%.

When measuring the molecular weight of (A-5), Mw/Mn=3.26 was observed and the content of low-molecular weight component with molecular weight of less than 2,000 was 0.80%.

Preparing Example 6

Five kg of maleic anhydride-modified propylene-ethylene copolymer in which the low-molecular weight component was not removed in Preparing example 3 were thrown into a glass-lined reactor with stirrer and 80 liters of chloroform were added. After sufficiently dissolved at 110° C. under pressure of 3 kg/cm², 5 g of azobisisobutyronitrile were added as a radical generator and, while keeping this temperature, chlorine gas was blown-in from the bottom of reactor to conduct chlorination reaction until the chlorine content became 17 wt. %. After the solvent chloroform was distilled off by evaporator, tert-butylphenyl glycidyl ether (monoepoxy) was added in amounts of 5% based on solids as a stabilizer, and residual chloroform was removed completely with a vent extruder installed with vent port for distilling it under reduced pressure to obtain carboxyl group-containing chlorinated propylene-ethylene copolymer in the form of pellet-like solid product.

Next, 4 kg of this pellet were put into a three-neck flask attached with stirrer and cooling pipe for refluxing solvent, then 9 kg of ethanol (b.p. 78.3° C.) and 1 kg of cyclohexane (b.p. 80.7° C.) were put in, and, while refluxing the solvent for 4 hours at 78° C., the low-molecular weight component was dissolved out into solvent. Next, solvent was taken off by filtration and the filter residue was washed with said solvent, followed by drying under reduced pressure. The recovery rate at this time was 65%. Then, after tert-butylphenyl glycidyl ether was added in amounts of 4% based on solids as a stabilizer, the filter residue was dissolved into toluene to obtain maleic anhydride-modified propylene-ethylene copolymer (A-6) with low-molecular weight component removed in the form of toluene solution with solids concentration of 20%.

When measuring the molecular weight of (A-6), Mw/Mn=2.78 was observed and the content of low-molecular weight component with molecular weight of less than 2,000 was 0.35%.

Preparing Example 7

Five kg of maleic anhydride-modified polypropylene, in which the low-molecular weight component was not removed in Preparing example 1 were put into a glass-lined reactor and 80 liters of chloroform were added. After sufficiently dissolved at 120° C. under pressure of 4 kg/cm², chlorine gas was blown-in from the bottom of rector while keeping the temperature at 110° C. and irradiating ultraviolet rays to conduct chlorination reaction until the chlorine content became 25 wt. %, and the solvent chloroform was distilled off by evaporator. After solvent was replaced with a mixed solvent of toluene/cyclohexane=65/35 (wt.), Epicote 828 was added in amounts of 4% based on solids as a stabilizer and concentration was adjusted to obtain carboxyl group-containing chlorinated polypropylene (B-1) in the form of solution with solids concentration of 20%.

When measuring the molecular weight of (B-1), Mw/Mn= 5.77 was observed and the content of low-molecular weight component with molecular weight of less than 2,000 was 3.65%.

Preparing Example 8

Five kg of maleic anhydride-modified propylene-butene-ethylene copolymer in which the low-molecular weight component was not removed in Preparing example 2 were thrown into a glass-lined reactor with stirrer and 80 liters of chloroform were added. After sufficiently dissolved at 100° C. by stirring under pressure of 3 kg/cm$^2$, 5 g of azobisisobutyronitrile were added as a radical generator and, while keeping this temperature, chlorine gas was blown-in from the bottom of reactor to conduct chlorination reaction until the chlorine content became 12 wt. %. After the solvent chloroform was distilled off by evaporator and replaced with toluene, Epicote 828 was added in amounts of 4% based on solids as a stabilizer and concentration was adjusted to obtain carboxyl group-containing chlorinated propylene-butene-ethylene copolymer (B-2) in the form of toluene solution with solids concentration of 20%.

When measuring the molecular weight of (B-2), Mw/Mn= 9.58 was observed and the content of low-molecular weight component with molecular weight of less than 2,000 was 7.05%.

Preparing Example 9

Five kg of maleic anhydride-modified propylene-ethylene copolymer in which the low-molecular weight component was not removed in Preparing example 3 were thrown into a glass-lined reactor with stirrer and 80 liters of chloroform were added. After sufficiently dissolved at 110° C. under pressure of 3 kg/cm$^2$, 5 g of azobisisobutyronitrile were added as a radical generator and, while keeping this temperature, chlorine gas was blown-in from the bottom of reactor to conduct chlorination reaction until the chlorine content became 17 wt. %. After the solvent chloroform was distilled off partially by evaporator, tert-butylphenyl glycidyl ether was added in amounts of 4% based on solids as a stabilizer, and residual chloroform was removed completely with a vent extruder installed with vent port for distilling it under reduced pressure to obtain carboxyl group-containing chlorinated propylene-ethylene copolymer in the form of solid product. Then, this solid product was dissolved into toluene to obtain (B-3) that was adjusted to toluene solution with solids concentration of 20%.

When measuring the molecular weight of (B-3), Mw/Mn= 7.06 was observed and the content of low-molecular weight component with molecular weight of less than 2,000 was 4.65%.

The substance of carboxyl group-containing chlorinated polyolefins (II) is shown in Table 1. Moreover, the substance of synthetic resins to be used by mixing with (II) is shown in Table 2.

TABLE 1

Substance of carboxyl group-containing chlorinated polyolefins (II) obtained in preparing examples 1 through 9

| Preparing example | Raw material polyolefin | Chlorine content (%) | Mw/Mn | Content of molecular weight less than 2000 (%) |
|---|---|---|---|---|
| 1 (A-1) | Crystalline polypropylene | 25 | 2.90 | 0.25 |
| 2 (A-2) | Propylene-butene-ethylene copolymer | 12 | 3.85 | 1.20 |
| 3 (A-3) | Propylene-ethylene copolymer | 17 | 3.65 | 0.75 |
| 4 (A-4) | Crystalline polypropylene | 25 | 2.55 | 0.12 |
| 5 (A-5) | Propylene-butene-ethylene copolymer | 12 | 3.26 | 0.80 |
| 6 (A-6) | Propylene-ethylene copolymer | 17 | 2.78 | 0.35 |
| 7 (B-1) | Crystalline polypropylene | 25 | 5.77 | 3.65 |
| 8 (B-2) | Propylene-butene-ethylene copolymer | 12 | 9.58 | 7.05 |
| 9 (B-3) | Propylene-ethylene copolymer | 17 | 7.06 | 4.65 |

Solids concentrations in preparing examples 1 through 9 are all 20%.

Examples 1 Through 12 and Comparative Examples 1 Through 3

Sampling was made according to the formulation recipes shown in Table 2 and, after kneading for 1 hour in a sand grinder mill, viscosity was adjusted with xylene so as to give 13 to 14 seconds/20° C. through Ford cup No. 4 to make each primer. Besides, synthetic resins to be used by mixing with carboxyl group-containing chlorinated polyolefin (II) are shown in Table 3.

Next, this primer was spray coated onto a polypropylene plate that was washed with water so as the film thickness to become 10 μm. Several minutes later, cure type two-component urethane paint was spray coated so as the film thickness to become 30 to 40 μm and, after dried for about 15 minutes at room temperature, this was dried forcedly for 30 minutes at 80° C. After allowed to stand for 3 days, tests of painted film were performed. The test results of painted film are shown in Table 4.

TABLE 2

Formulation recipe of primer [parts by weight]

| Resin composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Com. ex. 1 | Com. ex. 2 | Com. ex. 3 |
|---|---|---|---|---|---|---|---|---|---|---|---|---|---|---|---|
| A-1 | 100 | — | — | — | — | — | 30 | — | — | — | — | — | — | — | — |
| A-2 | — | 100 | — | — | — | — | — | 60 | — | — | — | — | — | — | — |

TABLE 2-continued

Formulation recipe of primer [parts by weight]

| Resin composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Com. ex. 1 | Com. ex. 2 | Com. ex. 3 |
|---|---|---|---|---|---|---|---|---|---|---|---|---|---|---|---|
| A-3 | — | — | 100 | — | — | — | — | — | 50 | — | — | — | — | — | — |
| A-4 | — | — | — | 100 | — | — | — | — | — | 70 | — | — | — | — | — |
| A-5 | — | — | — | — | 100 | — | — | — | — | — | 80 | — | — | — | — |
| A-6 | — | — | — | — | — | 100 | — | — | — | — | — | 90 | — | — | — |
| B-1 | — | — | — | — | — | — | — | — | — | — | — | — | 100 | — | — |
| B-2 | — | — | — | — | — | — | — | — | — | — | — | — | — | 100 | — |
| B-3 | — | — | — | — | — | — | — | — | — | — | — | — | — | — | 100 |
| Desmophene A160 | — | — | — | — | — | — | 23.3 | — | — | — | — | — | — | — | — |
| Pararoid A-11 | — | — | — | — | — | — | — | 8 | — | — | — | — | — | — | — |
| Phthalkyd V904 | — | — | — | — | — | — | — | — | 20 | — | — | — | — | — | — |
| Nippolan 165 | — | — | — | — | — | — | — | — | — | 6- | — | — | — | — | — |
| Desmophene 1900U | — | — | — | — | — | — | — | — | — | — | 4 | — | — | — | — |
| Nippolan 5138 | — | — | — | — | — | — | — | — | — | — | — | 6.7 | — | — | — |
| Titanium dioxide | 13.2 | 13.2 | 13.2 | 13.2 | 13.2 | 13.2 | 13.2 | 13.2 | 13.2 | 13.2 | 13.2 | 13.2 | 13.2 | 13.2 | 13.2 |
| Carbon black | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Xylene | — | — | — | — | — | — | 46.7 | 32 | 30 | 24 | 16 | 3.3 | — | — | — |

(Abbreviation) Ex.: Example, Com. ex.: Comparative example

TABLE 3

Substance of synthetic resins to be used by mixing with carboxyl group-containing chlorinated polyolefins (II) obtained in Preparing examples

| | Type of resin | Heating residue (%) | Content of OH (%) | Supplier |
|---|---|---|---|---|
| Desmophene A160 | Acrylic polyol | 60 | 1.6 | Bayer |
| Pararoid A-11 | Acrylic resin | 100 | — | Rohm & Haas |
| Phthalkyd V904 | Alkyd resin | 50 | — | Hitachi Chemical Co. |
| Nippolan 165 | Polyesterpolyol | 100 | 1.7 | Nippon Polyurethane Industry Co. |
| Demophene 1900U | Polyetherpolyol | 100 | 1.7 | Bayer |
| Nippolan 5138 | Urethane resin | 30 | — | Nippon Polyurethane Industry Co. |

TABLE 4

Test results of painted film (Performance test of primer)

| | Gasohol resistance | Adherence | Warm water resistance | Moisture resistance |
|---|---|---|---|---|
| Example 1 | After soaking for 5 hr, no peeling-off of painted film | 100/100 | No abnormalities of painted surface, Good adherence | No abnormalities of painted surface, Good adherence |
| Example 2 | After soaking for 3 hr, peeling off of painted film | 100/100 | No abnormalities of painted surface, Good adherence | No abnormalities of painted surface, Good adherence |
| Example 3 | After soaking for 4 hr, peeling-off of painted film | 100/100 | No abnormalities of painted surface, Good adherence | No abnormailties of painted surface, Good adherence |
| Example 4 | After soaking for 5 hr, no peeling-off of painted film | 100/100 | No abnormalities of painted surface, Good adherence | No abnormalities of painted surface, Good adherence |
| Example 5 | After soaking for 4 hr, peeling-off of painted film | 100/100 | No abnormalities of painted surface, Good adherence | No abnormalities of painted surface, Good adherence |
| Example 6 | After soaking for 5 hr, peeling-off of painted film | 100/100 | No abnormalities of painted surface, Good adherence | No abnormalities of painted surface, Good adherence |
| Example 7 | After soaking for 2 hr, peeling-off of painted film | 100/100 | No abnormalities of painted surface, Good adherence | No abnormalities of painted surface, Good adherence |
| Example 8 | After soaking for 2 hr, peeling-off of painted film | 100/100 | No abnormalities of painted surface, Good adherence | No abnormalities of painted surface, Good adherence |
| Example 9 | After soaking for 2 hr, peeling-off of painted film | 100/100 | No abnormalities of painted surface, Good adherence | No abnormalities of painted surface, Good adherence |
| Example 10 | After soaking for 3 hr, peeling-off of painted film | 100/100 | No abnormalities of painted surface, Good adherence | No abnormalities of painted surface, Good adherence |

TABLE 4-continued

Test results of painted film (Performance test of primer)

| | Gasohol resistance | Adherence | Warm water resistance | Moisture resistance |
|---|---|---|---|---|
| Example 11 | After soaking for 2 hr, peeling-off of painted film | 100/100 | No abnormalities of painted surface, Good adherence | No abnormalities of painted surface, Good adherence |
| Example 12 | After soaking for 4 hr, peeling-off of painted film | 100/100 | No abnormalities of painted surface, Good adherence | No abnormalities of painted surface, Good adherence |
| Com. example 1 | After soaking for 50 min, peeling-off of painted film | 100/100 | No abnormalities of painted surface, Good adherence | No abnormalities of painted surface, Good adherence |
| Com. example 2 | After soaking for 30 min, peeling-off of painted film | 100/100 | No abnormalities of painted surface, poor adherence | No abnormalities of painted surface, poor adherence |
| Com. example 3 | After soaking for 40 min, peeling-off of painted film | 100/100 | No abnormalities of painted surface, Good adherence | No abnormalities of painted surface, poor adherence |

Testing Methods of Painted Film 1 (Performance Test of Primer)

Gasohol Resistance

A painted plate cut at both ends was soaked into a mixed gasoline of regular gasoline: ethanol=9:1, and judgment was made by the time until a distance of about 2 mm was peeled off from the end of cut painted surface.

Adherence

A hundred cross-cuts reaching the base were made on the painted surface at intervals of 1 mm and cellophane adhesive tape was adhered closely. Then, it was peeled off in the direction of 180° to examine the number of remaining cross-cuts.

Warm Water Resistance

A painted plate was soaked for 240 hours into warm water of 40° C. to examine the state of painted film. Moreover, a scratch (x mark) reaching the base was carved on the painted surface and cellophane adhesive tape was adhered closely thereon. Then, it was peeled off in the direction of 180° to examine the adherence of painted film.

Moisture Resistance

A specimen was allowed to stand for 240 hours in an atmosphere of 50° C. and relative humidity of 98%, and the state and adherence of painted film were examined by the method similar to that for warm water resistance.

Examples 13 Through 18 and Comparative Examples 4 Through 6

Sampling was made according to the formulation recipes of painted shown in Table 5 and, after kneading for 1 hour in a sand grinder mill, viscosity was adjusted with xylene so as to give 12 to 13 seconds/20° C. through Ford cup No. 4 to make white paint.

Next, this white paint was spray coated onto a polypropylene plate that was washed with water so as the film thickness to become 40 $\mu$m and, after dried for 15 minutes at room temperature, this was dried forcedly for 30 minutes at 80° C. After allowed to stand for a week in the room, tests of painted film were performed. The test results of painted film are shown in Table 6.

TABLE 5

Formulation recipe of paint [parts by weight]

| Resin composition | Ex. 13 | Ex. 14 | Ex. 15 | Ex. 16 | Ex. 17 | Ex. 18 | Com. ex. 4 | Com. ex. 5 | Com. ex. 6 |
|---|---|---|---|---|---|---|---|---|---|
| A-1 | 100 | — | — | — | — | — | — | — | — |
| A-2 | — | 100 | — | — | — | — | — | — | — |
| A-3 | — | — | 100 | — | — | — | — | — | — |
| A-4 | — | — | — | 100 | — | — | — | — | — |
| A-5 | — | — | — | — | 100 | — | — | — | — |
| A-6 | — | — | — | — | — | 100 | — | — | — |
| B-1 | — | — | — | — | — | — | 100 | — | — |
| B-2 | — | — | — | — | — | — | — | 100 | — |
| B-3 | — | — | — | — | — | — | — | — | 100 |
| Phthalkyd V904 | 60 | 60 | 60 | 60 | 60 | 60 | 60 | 60 | 60 |
| Titanium dioxide | 33.3 | 33.3 | 33.3 | 33.3 | 33.3 | 33.3 | 33.3 | 33.3 | 33. |
| Xylene | 40 | 40 | 40 | 40 | 40 | 40 | 40 | 40 | 40 |

(Abbreviation) Ex.: Example, Com. ex.: Comparative example

TABLE 6

Test results of painted film (Performance test of paint)

|  |  |  | Ex. 13 | Ex. 14 | Ex. 15 | Ex. 16 | Ex. 17 | Ex. 18 | Com. ex. 4 | Com. ex. 5 | Com. ex. 6 |
|---|---|---|---|---|---|---|---|---|---|---|---|
|  | Adherence |  | ⊚ | ⊚ | ⊚ | ⊚ | ⊚ | ⊚ | ⊚ | ⊚ | ⊚ |
| Weather resistance | Brightness (%) | 0 hr | 85 | 84 | 85 | 83 | 82 | 86 | 84 | 86 | 83 |
|  |  | 200 hr | 84 | 84 | 83 | 82 | 81 | 83 | 77 | 75 | 74 |
|  |  | 500 hr | 82 | 81 | 81 | 80 | 80 | 82 | 66 | 64 | 60 |
|  |  | 1000 hr | 80 | 79 | 80 | 79 | 78 | 77 | 55 | 53 | 50 |
| Warm water resistance (40° C.) |  | 120 hr | ⊚ | ⊚ | ⊚ | ⊚ | ⊚ | ⊚ | ○ | △ | △ |
|  |  | 240 hr | ○ | ○ | ○ | ○ | ○ | ○ | x | x | x |
| Moisture resistance 50° C.—98% RH |  | 120 hr | ⊚ | ⊚ | ⊚ | ⊚ | ⊚ | ⊚ | △ | △ | △ |
|  |  | 240 hr | ○ | ○ | ○ | ○ | ○ | ○ | x | x | x |

Evaluation criteria in table: ⊚ Good, ○ Almost good, △ Slightly poor, x Poor
(Abbreviation) Ex.: Example, Com. ex.: Comparative example Testing Methods of Painted Film 2 (Performance Test of Paint)

Adherence

A hundred cross-cuts reaching the base were made on the painted surface at intervals of 1 mm and cellophane adhesive tape was adhered closely. Then, it was peeled off in the direction of 180° to examine the number of remaining cross-Cuts.

Accelerated Weather Resistance carbon arc type sunshine weathermeter was used. The brightness was measured with Hunter.

Warm Water Resistance

A painted plate was soaked for 120 hours and 240 hours into warm water of 40° C. to examine the state of painted film. Moreover, a scratch (x mark) reaching the base was carved on the painted surface and cellophane adhesive tape was adhered closely thereon. Then, it was peeled off in the direction of 180° to examine the adherence of painted film.

Moisture Resistance

A specimen was allowed to stand for 120 hours and 240 hours in an atmosphere of 50° C. and relative humidity of 98%, and the state and adherence of painted film were examined by the method similar to that for warm water resistance.

Examples 19 Through 24 and Comparative Examples 7 Through 93

Sampling was made according to the formulation recipes of ink shown in Table 7 and, after kneading for 3 hour in a sand grinder mill, viscosity was adjusted with toluene so as to give 25 to 30 seconds/20° C. through Zahn cup No. 3 to make red ink.

Next, this red ink was coated onto an untreated polypropylene film (hereinafter referred to as untreated PP) and a corona treated polypropylene film (hereinafter referred to as treated PP) with coating rod No. 14, respectively. After dried for 24 hours in the room, Cellotape peeling test using cellophane adhesive tape and heat seal strength test were performed. The test results are shown in Table 8.

TABLE 7

Formulation recipe of ink [parts by weight]

| Resin composition | Ex. 19 | Ex. 20 | Ex. 21 | Ex. 22 | Ex. 23 | Ex. 24 | Com. ex. 7 | Com. ex. 8 | Com. ex. 9 |
|---|---|---|---|---|---|---|---|---|---|
| A-1 | 150 | — | — | — | — | — | — | — | — |
| A-2 | — | 150 | — | — | — | — | — | — | — |
| A-3 | — | — | 150 | — | — | — | — | — | — |
| A-4 | — | — | — | 150 | — | — | — | — | — |
| A-5 | — | — | — | — | 150 | — | — | — | — |
| A-6 | — | — | — | — | — | 150 | — | — | — |
| B-1 | — | — | — | — | — | — | 150 | — | — |
| B-2 | — | — | — | — | — | — | — | 150 | — |
| B-3 | — | — | — | — | — | — | — | — | 150 |
| Nippolan 5138 | 67 | 67 | 67 | 67 | 67 | 67 | 67 | 67 | 67 |
| *Carmine 6BN | 10.5 | 10.5 | 10.5 | 10.5 | 10.5 | 10.5 | 10.5 | 10.5 | 10.5 |

*Carmine 6BN: Azo type organic pigment, red (from Tokyo Ink Mfg. Co.)
(Abbreviation) Ex.: Example, Com. ex.: Comparative example

TABLE 8

Test results of ink

|  |  | Ex. 19 | Ex. 20 | Ex. 21 | Ex. 22 | Ex. 23 | Ex. 24 | Com ex. 7 | Com ex. 8 | Com ex. 9 |
|---|---|---|---|---|---|---|---|---|---|---|
| Cellotape peeling | Untreated PP | Good | Good | Good | Good | Good | Good | Poor | Poor | Poor |
|  | Treated PP | Good | Good | Good | Good | Good | Good | Poor | Good | Good |
| Heat seal strength (g/cm) | Untreated PP | 158 | 160 | 157 | 155 | 153 | 161 | 76 | 85 | 92 |
|  | Treated PP | 255 | 280 | 275 | 266 | 271 | 287 | 135 | 155 | 152 |

(Abbreviation) Ex.: Example, Com ex.: Comparative example

Testing Methods of Ink

Cellotape Peeling Test

Cellophane adhesive tape was stuck on the ink-coated surface to judge the peeling state of ink on the coated surface when peeling off at a stroke.

Heat Seal Strength Test

The ink-coated surfaces were superposed one another and pressed for 2 seconds at 110° C. under pressure of 1 kg/cm$^2$ to heat seal. After allowed to stand for 24 hours in the room, test of 180° peeling strength was performed with Tensilon. Pulling speed (50 mm/min).

Examples 25 Through 31 and Comparative Examples 10 Through 12

Solutions of chlorinated polyolefins of (A-1) through (A-6) and (B-1) through (B-3) were coated onto untreated PP and treated PP with coating rod No. 20, respectively. After dried for 24 hours in the room, heat seal strength test was performed. The results of adhesion test are shown in table 9. Besides, the method of heat seal strength test was followed the method as described above.

poor and the warm water resistance and moisture resistance are slightly poor. Based on these facts, it is seen that the inventive primer compositions are useful for the polyolefinic resin moldings.

From the results in Table 6, as Examples 13 through 18, the white paints made by mixing carboxyl group-containing chlorinated polyolefins (II) with low-molecular weight region removed with "Phthalkyd V904" being an alkyd resin show no significant deterioration after each testing of accelerated weather resistance, water resistance and moisture resistance. However, as Comparative examples 4 through 6, with the white paints made similarly by using carboxyl group-containing chlorinated polyolefins with low-molecular weight region unremoved, yellowing was seen on the painted surface after testing of accelerated weather resistance and decreased adherence was seen after each testing of warm water resistance and moisture resistance. Based on these facts, it is seen that the inventive paint compositions are useful for the polyolefinic resin moldings.

From the results in Table 8, as Examples 19 through 24, the red inks made by mixing carboxyl group-containing chlorinated polyolefins (II) with low-molecular weight

TABLE 9

Results of adhesion test

|  |  | Ex. 25 | Ex. 26 | Ex. 27 | Ex. 28 | Ex. 29 | Ex. 30 | Com ex. 10 | Com ex. 11 | Com ex. 12 |
|---|---|---|---|---|---|---|---|---|---|---|
| Heat seal strength (g/cm) | Untreated PP | 345 | 368 | 371 | 355 | 382 | 379 | 163 | 172 | 168 |
|  | Treated PP | 430 | 462 | 450 | 482 | 473 | 457 | 268 | 289 | 276 |

(Abbreviation) Ex.: Example, Com ex.: Comparative example

Utilizability in the Industry

From the results in table 4, as Examples 1 through 6, carboxyl group-containing chlorinated polyolefins (II) with low-molecular weight region removed are excellent in the gasohol resistance, warm water resistance and moisture resistance. Moreover, as Examples 7 through 12, even mixtures of said carboxyl group-containing chlorinated polyolefins (II) with alkyd resin, acrylic resin, polyacrylic polyol, polyesterpolyol, polyetherpolyol, polyurethane resin, etc. exhibit no remarkable decrease in the gasohol resistance and are also excellent in the moisture resistance and warm water resistance. While, as Comparative examples 1 through 3, carboxyl group-containing chlorinated polyolefins with low-molecular weight region unremoved show such results that the gasohol resistance becomes remarkably region removed with "Nippolan 5138" being an urethane resin are excellent in the Cellotape peeling and heat seal strength, compared with the red inks made similarly by using carboxyl group-containing chlorinated polyolefins with low-molecular weight region unremoved, as Comparative examples 7 and 8. Based on these facts, it is seen that the inventive ink compositions are useful for the polyolefinic resin films.

From the results in Table 9, as examples 25 through 30, the systems wherein untreated PPs or treated PPs were stuck one another by heat sealing using carboxyl group-containing chlorinated polyolefins (II) with low-molecular weight region removed as an adhesive are excellent in the adhesion strength, compared with the systems using carboxyl group-containing chlorinated polyolefins with low-molecular weight region unremoved as an adhesive. Based on these facts, it is seen that the inventive adhesive compositions are useful for the polyolefinic resin films.

What is claimed is:

1. A binder resin for polyolefinic resins comprising carboxyl group-containing chlorinated polyolefin (II), which is a carboxyl group-containing chlorinated polyolefin obtainable by graft copolymerizing at least one kind of unsaturated carboxylic monomer selected from carboxylic acid and/or carboxylic anhydride onto a polyolefin (I) in amounts of 1 to 10 wt. % and then chlorinating to chlorine content of 10 to 30 wt. %, which contains not more than 2% wt. of a component with molecular weight of 2,000 or lower, being the low-molecular weight region of said carboxyl group-containing chlorinated polyolefin, and which carboxyl group-containing chlorinated polyolefin (II) has a ratio (Mw/Mn) of weight average molecular weight (Mw) to number average molecular weight (Mn) of not more than 4.

2. The binder resin for polyolefinic resins of claim 1, wherein the polyolefin (I) is a polypropylene with weight average molecular weight of 10,000 to 150,000, a propylene-α-olefin copolymer with weight average molecular weight of 10,000 to 150,000 containing 70 to 97 mol % of propylene component and the number of carbon atoms of α-olefin is 2 or 4 to 6, or a propylene-butene-ethylene terpolymer with weight average molecular weight of 10,000 to 150,000 containing 70 to 97 mol % of propylene component, 2 to 25 mol % of butene component and 2 to 25 mol % of ethylene component.

3. The binder resin for polyolefinic resins comprising the carboxyl group-containing chlorinated polyolefin (II) of claim 2 mixed with a resin selected from the group consisting of alkyd resin, acrylic resin, polyacrylic polyol, polyesterpolyol, polyether resin, polyetherpolyol, and polyurethane resin in proportion at a ratio by weight of 3:7 to 9:1.

4. The binder resin of claim 2, wherein said polypropylene is a crystalline polypropylene.

5. A primer composition for polyolefinic resins comprising the binder resin of claim 2.

6. A paint composition for polyolefinic resins comprising the binder resin of claim 2.

7. An ink composition for polyolefinic resins comprising the binder resin of claim 2.

8. An adhesive composition for polyolefinic resins comprising the binder resin of claim 2.

9. The binder resin for polyolefinic resins comprising the carboxyl group-containing chlorinated polyolefin (II) of claim 1 mixed with a resin selected from the group consisting of alkyd resin, acrylic resin, polyacrylic polyol, polyesterpolyol, polyether resin, polyetherpolyol and polyurethane resin in proportion at a ratio by weight of 3:7 to 9:1.

10. A primer composition for polyolefinic resins comprising the binder resin of claim 9.

11. A paint composition for polyolefinic resins comprising the binder resin of claim 9.

12. An ink composition for polyolefinic resins comprising the binder resin of claim 9.

13. An adhesive composition for polyolefinic resins comprising the binder resin of claim 9.

14. A primer composition for polyolefinic resins comprising the binder resin of claim 1.

15. A paint composition for polyolefinic resins comprising the binder resin of claim 1.

16. An ink composition for polyolefinic resins comprising the binder resin of claim 1.

17. An adhesive composition for polyolefinic resins comprising the binder resin of claim 1.

18. A method of producing binder resin for polyolefinic resins comprising carboxyl group-containing chlorinated polyolefin (II), which is a carboxyl group-containing chlorinated polyolefin, which contains not more than 2% wt. of a component with molecular weight of 2,000 or lower, being the low-molecular weight region of said carboxyl group-containing chlorinated polyolefin, and which carboxyl group-containing chlorinated polyolefin (II) has a ratio (Mw/Mn) of weight average molecular weight (Mw) to number average molecular weight (Mn) of not more than 4, characterized in that the low-molecular weight region of carboxyl group-containing chlorinated polyolefin obtainable by graft copolymerizing at least one kind of unsaturated carboxylic monomer selected from carboxylic acid and/or carboxylic anhydride onto a polyolefin (I) in amounts of 1 to 10 wt. % is removed by solvent extraction within a temperature range of 10° C. to 100° C., using a sole solvent selected from a group consisting of aliphatic hydrocarbon, aromatic hydrocarbon, alicyclic hydrocarbon, halogenated hydrocarbon, alcohols, esters, ketones and ethers with boiling point of lower than 120° C. or a mixed solvent thereof, and then chlorination is conducted to a chlorine content of 10 to 30 wt. %.

19. A method of producing binder resin for polyolefinic resins comprising carboxyl group-containing chlorinated polyolefin (II), which is a carboxyl group-containing chlorinated polyolefin, which contains not more than 2% wt. of a component with molecular weight of 2,000 or lower, being the low-molecular weight region of said carboxyl group-containing chlorinated polyolefin, and which carboxyl group-containing chlorinated polyolefin (II) has a ratio (Mw/Mn) of weight average molecular weight (Mw) to number average molecular weight (Mn) of not more than 4, characterized in that at least one kind of unsaturated carboxylic monomer selected from carboxylic acid and/or carboxylic anhydride is graft copolymerized onto a polyolefin (I) in amounts of 1 to 10 wt. %, and then the low-molecular weight region of carboxyl group-containing chlorinated polyolefin chlorinated to chlorine content of 10 to 30 wt. % is removed by solvent extraction within a temperature range of 0° C. to 100° C., using a sole solvent selected from a group consisting of aliphatic hydrocarbon, aromatic hydrocarbon, alicyclic hydrocarbon, halogenated hydrocarbon, alcohols, esters, ketones and ethers with boiling point of lower than 120° C. or a mixed solvent thereof.

* * * * *

UNITED STATES PATENT AND TRADEMARK OFFICE
CERTIFICATE OF CORRECTION

PATENT NO. : 6,586,525 B1
DATED : July 1, 2003
INVENTOR(S) : Urata et al.

It is certified that error appears in the above-identified patent and that said Letters Patent is hereby corrected as shown below:

<u>Title page,</u>
Item [30], Foreign Application Priority Data, should read:

-- [30]     Foreign Application Priority Data

Oct. 30, 1998   (JP) .................................... 10-309609
        Sep. 9, 1999    (JP) .................................... 11-255662 --

Signed and Sealed this

Tenth Day of February, 2004

JON W. DUDAS
*Acting Director of the United States Patent and Trademark Office*